M. MOORE.
Powder-Duster for Destroying Insects.
No. 199,733. Patented Jan. 29, 1878.
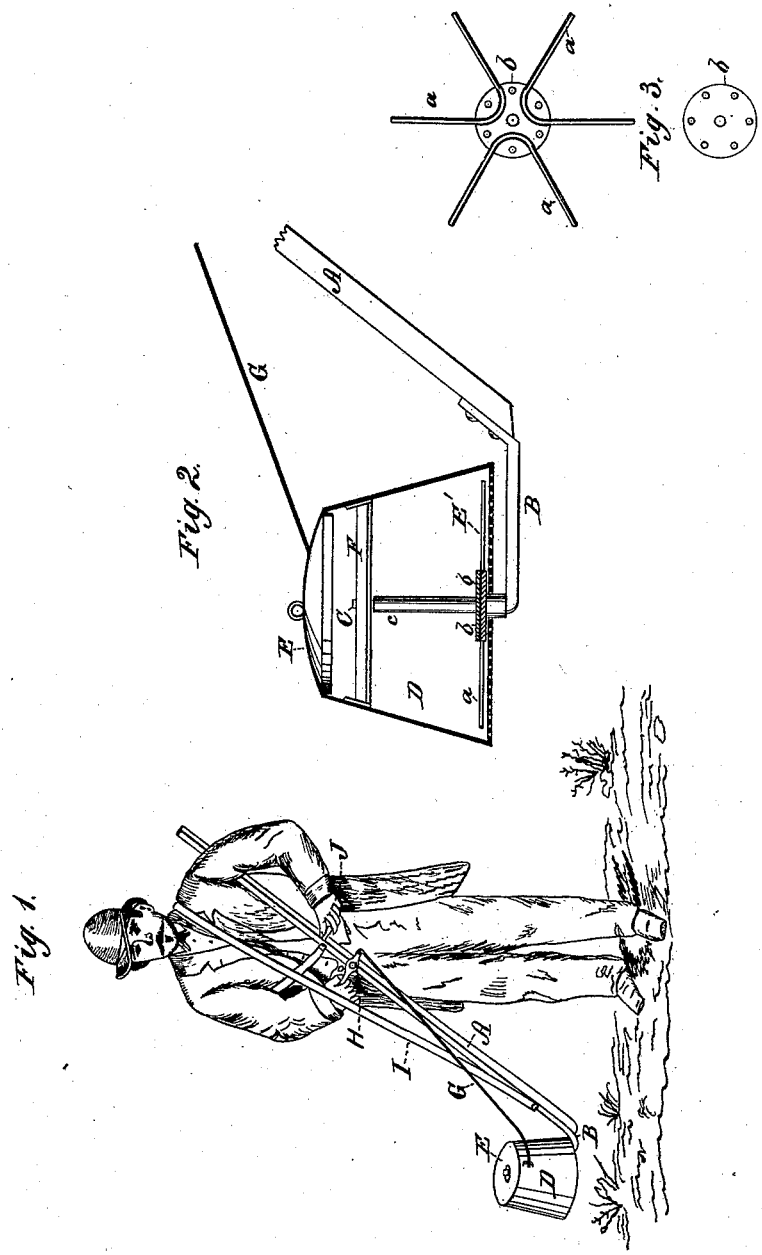

UNITED STATES PATENT OFFICE.

MATTHEW MOORE, OF WHIPPANY, NEW JERSEY.

IMPROVEMENT IN POWDER-DUSTERS FOR DESTROYING INSECTS.

Specification forming part of Letters Patent No. 199,733, dated January 29, 1878; application filed June 20, 1877.

*To all whom it may concern:*

Be it known that I, MATTHEW MOORE, of Whippany, in the county of Morris and State of New Jersey, have invented a new and Improved Insect-Destroying Device; and I do hereby declare that the following is a full, clear, and exact description of the same, reference being had to the accompanying drawings, forming part of this specification, in which—

Figure 1 is a view showing the manner of using the device; Fig. 2, a vertical section through the center of the powder-receptacle; and Fig. 3, details of the agitator.

My invention relates to an improved device for applying poisonous powder to plants for the destruction of insects, which device is adapted also to the application of fertilizers to plants.

It consists of a rod having a metal shank and standard at its lower end, arranged at such an angle that when the rod is supported in an inclined position by means of a strap passing around the shoulder the standard is vertical, the said devices being combined with a horizontally-oscillating receptacle having a perforated bottom, an agitator within the same, and a lever and connecting-rod for imparting the said motion, all as hereinafter more fully described.

In the drawings, A represents the wooden rod or staff, to the lower end of which is attached a metal shank, B, bent up at its end to form a standard, C. D is the receptacle for the powder, made of a truncated conical form, largest at the bottom, and provided with a hinged cover or lid, E. The bottom of the receptacle is perforated with numerous holes, after the manner of a sieve, and just above the same, inside the receptacle, is arranged an agitator, E', which serves, when the receptacle is turned, to sift the powder through the holes. This agitator consists of a set of radial arms, $a$, held between clamp-plates $b\ b$, which are secured to a tube, $c$, fastened to the standard C, or upright portion of the shank.

In arranging the radial arms or stirrers $a$, (see Fig. 3,) I make two of them in one piece of wire, bend them in the middle to the required angle, and then place their bent ends next to the tube in grooves in the clamp-plates shaped to receive them, and there secure them by fastening together the clamp-plates. This serves to hold the arms strongly in place without special fastenings. The lower end of the tube carrying the agitator is extended through the perforated bottom of the powder-receptacle, and the latter is supported upon the end of the standard C by a cross-bar, F, having a pivotal connection with said standard, so that the receptacle is free to turn while the agitator remains rigid with the standard.

To secure a movement between the perforated bottom of the receptacle and the agitator, a connecting-rod, G, is attached to the receptacle at one end, and at the other is loosely connected with the end of a lever, H, pivoted to the rod A, so that by oscillating the lever the receptacle is oscillated in a horizontal plane upon its pivot, to sift the powder through its perforated bottom. In the place of this lever and rod, a cord and pulley may be employed, if desired, or the rod may be retained, and a disk or pulley, with crank-handle, be substituted for the lever, so that the same result will be attained by a continuous rotation of the crank-handle.

I is a strap, fastened to the handle or staff A in such a manner as to pass around the shoulder of the operator, to sustain the weight of the device, while J is a handle for steadying the device by the left hand while the lever is being operated by the right.

In making use of the device it is applied to the person, and manipulated as shown in Fig. 1, in which position it will be seen it can conveniently be used either for applying poison to plants or for fertilizing the same.

I am aware of the device shown in Patent No. 187,717, and I therefore claim only my particular arrangement, which possesses the following distinctive advantages: First, the peculiar arrangement of the shank, bar, and pivoted character of the receptacle allows the poison to be discharged only at the bottom, and diminishes the tendency of the poison-dust to fly, while it also allows one end of the receptacle to be entirely opened, so that in inserting the poison the operator is not exposed so long a time to the dust. The strap also sustains the weight of the device, leaving the hand free to operate the same, but still holding the rod in its proper inclined position.

Having thus described my invention, what I claim as new is—

1. The receptacle D, having a cover, E, for its upper end, a perforated bottom, and a supporting cross-bar, F, located below its said upper end, in combination with the agitator E', the rod A, having angular shank and standard C, the connecting-rod G, lever H, and the straps I, substantially as and for the purpose described.

2. The agitator consisting of the clamp-plates $b\ b$ and the stirrers $a$, bent in the middle and secured as described, in combination with the receptacle having perforated bottom, as and for the purpose described.

MATTHEW MOORE.

Witnesses:
W. H. HOWELL,
A. L. ALLEN.